United States Patent [19]

Berteaud et al.

[11] Patent Number: 5,234,760
[45] Date of Patent: Aug. 10, 1993

[54] COMPOSITE MATERIAL COMPRISING A SUBSTRATE AND A POLYMERIC BASED COATING AND PROCESS FOR THE MANUFACTURE THEREOF

[75] Inventors: Andre-Jean Berteaud, Draveil; Daniel Cuzin, Port Marly; Jean-Luc Perillon, Bernay, all of France

[73] Assignee: Elf Atochem, S.A., France

[21] Appl. No.: 897,595

[22] Filed: Jun. 10, 1992

Related U.S. Application Data

[63] Continuation of Ser. No. 502,263, Mar. 30, 1990, abandoned.

[30] Foreign Application Priority Data

Mar. 31, 1989 [FR] France ................................ 89 04260

[51] Int. Cl.⁵ ............................................ B32B 27/08
[52] U.S. Cl. .................................. 428/332; 427/385.5; 428/334; 428/474.4; 428/475.2; 428/476.3
[58] Field of Search ..................... 428/474.4, 421, 422, 428/332, 335, 475.2, 476.3; 427/385.5

[56] References Cited

FOREIGN PATENT DOCUMENTS

WO85/01294 3/1985 European Pat. Off. .
2051660 1/1981 United Kingdom .

*Primary Examiner*—Thomas J. Herbert, Jr.

[57] ABSTRACT

A composite material comprising a substrate which is not or very slightly excitable by microwaves and a coating on at least a portion of said substrate based on polymeric composition containing at least 50% by weight of a polymer excitable by microwaves, wherein the melting point of the substrate is lower than the film-formation temperature of the polymeric composition and the process of making such composite.

10 Claims, No Drawings

COMPOSITE MATERIAL COMPRISING A SUBSTRATE AND A POLYMERIC BASED COATING AND PROCESS FOR THE MANUFACTURE THEREOF

This application is a continuation of application Ser. No. 502,263 filed Mar. 30, 1990, now abandoned.

BACKGROUND OF THE INVENTION

The present invention relates to a composite material comprising a substrate and a coating based on a powder polymeric composition covering the said substrate and to a process for the preparation of this composite material such that the energy necessary for forming a film of the powder polymeric composition on the substrate is transmitted by an electromagnetic radiation in the microwave region.

Various techniques for ensuring the drying and/or the film formation of polymeric compositions by electromagnetic radiation in the microwave region are known.

French Patent published under No. 2,176,395 in the name of Donald Macpherson Group Limited describes the drying, by the action of microwaves, of a latex or of a dispersion of at least 2 polymers whose film-forming temperatures are close to room temperature.

French Patent published under No. 2,458,323 describes a process for coating a substrate of the glass type with a liquid coating based on heat-curable polymers which are dried and cured by an application of microwave energy.

SUMMARY OF THE INVENTION

The process of the instant invention makes it possible to cover substrates whose melting point is lower than the film-formation temperature of the coating.

This process comprises a stage which consists in covering the chosen substrate with the aid of a coating based on a powder polymeric composition, followed by a stage which consists in the actual film formation of the coating which is subjected to an electromagnetic radiation.

The invention also relates to the resultant composite as hereinafter set forth and described.

DETAILED DESCRIPTION

The substrate consists of a material which is nonconductive and preferably not or very slightly excitable by microwaves.

The excitability of a molecule by microwaves depends on its dipole moment. A molecule is proportionally more excitable by microwaves the greater its dipole moment and coversely, a molecule whose dipole moment is zero is not sensitive to the action of microwaves.

The excitability of a material by microwaves can be characterized by the dielectric losses coefficient which relates to microwave absorption ability of all the molecules of said material.

In general, the dielectric losses coefficient is comprised between 0 and 1 and it is superior or equal to 0.1 for an excitable material The substrate may be based on polymeric material.

Among the polymers capable of entering the composition of the substrate there may be mentioned polyolefins, perhalogenated or otherwise, such as polyethylene, polypropylene, polytetrafluoroethylene, by themselves or mixed.

Although the thickness of the substrate is not critical as such, it will be preferably greater than 3 mm, so that the said substrate possesses some rigidity.

The coating in accordance with the invention is based on a powder polymeric composition with a mean particle size which is generally less than 200 $\mu$m.

The thickness of the coating is advantageously inferior or equal to 30 $\mu$m and preferably less than 100 $\mu$m.

The polymeric composition preferably contains at least 50% by weight of one or more polymers which are excitable by microwaves.

Among polymers which are excitable by microwaves there may be mentioned the homo- or copolymers in solid form which are derived from monomers such as methyl methacrylate, vinyl acetate, higher esters of acrylic and methacrylic acids, such as n-butyl methacrylate or isobutyl acrylate, esters of fumaric and maleic acids or vinyl esters, acrylamides, aminomethacrylates, hydroxyacrylates, N-methylolacrylamides, acrylic and methacrylic acids, vinyl or vinylidene halides, allyl or vinyl esters, such as polyvinylidene fluoride, and copolymers of vinylidene fluoride and of one or more perfluorinated or chlorofluorinated comonomers.

Polyamides and polyetheramides may also be mentioned.

Polyamides are understood to mean the polymers resulting from the polycondensation of one or more (a) aminoacids such as aminocaproic, 7-aminoheptanoic, 11-aminoundecanoic or 12-aminododecanoic acids, and the like, (b) of one or more lactams such as caprolactam, oenantholactam, lauryllactam, and the like, or (c) of one or more salts or mixtures of diamines such as hexamethylenediamine, dodecamethylenediamine, metaxylylenediamine, bis-p-aminocyclohexylmethane, trimethylhexamethylenediamine, and the like with diacids such isophthalic, terephthalic, adipic, azelaic, suberic, sebacic and dodecanedicarboxylic acids, and the like, or of mixtures of all these monomers, which results in copolyamides.

Polyetheramides are understood to mean both random polyetheramides (that is to say, formed by random sequence formation by the various monomeric constituents) and block polyetheramides (that is to say, those made up of blocks exhibiting a certain chain length of their various constituents).

Block polyetheramides result from the copolycondensation of polyamide blocks with reactive ends with polyether blocks with reactive ends, such as, inter alia:

(1) Polyamide blocks with diamine chain ends with polyoxyalkylene blocks with dicarboxylic chain ends, (2) Polyamide blocks with dicarboxylic chain ends with polyoxyalkylene blocks with diamine chain ends obtained by cyanoethylation and hydrogenation of aliphatic alpha, omega-dihydroxylated polyoxyalkylene blocks, called polyetherdiols, or (3) Polyamide blocks with dicarboxylic chain ends with polyetherdiols, the polyetheramides obtained being polyetheresteramides in this particular case.

The composition and the manufacture of polyetheresteramides have been described in French Patents No. 74/18,913 and 77/26,678 in the name of Atochem, the assignee of the instant application and the content of which is incorporated in the present are incorporated in the present specification by reference.

The polymeric coating composition may also contain various additives, such as fillers; wetting, antioxidant, fungicidal, antisettling and thickening agents, as well as pigments and/or colorants such as titanium dioxide, carbon black, chrominum oxide, black, red and brown yellow iron oxides, cobalt blue, and the like.

In general, up to 50% by weight of additives can be incorporated relative to the total weight of the formulation containing the composition according to the invention.

The powder polymeric composition according to the invention may be applied as such to the substrate to be coated, or in a liquid form, that is to say after the powder has been dispersed in one or more solvents, latent or otherwise.

Before coating, it is preferable to carry out a degreasing of the surface of the substrate to be coated, with the aid, for example, of a solvent chosen from the class of ketones, alcohols, or chlorocarbons.

The substrate to be coated may be subjected to one or more surface treatments other than degreasing, in order to improve the adhesiveness of the coating to the substrate. By way of examples, there may be mentioned the deposition of adhesive primer, and treatments of an oxidizing type such as flaming, corona discharge or the action of a plasma.

When the coating is applied in powder form, it is possible to sift the required quantity of powder onto the surface of the substrate to be coated, to operate using electrostatic powder spraying with the aid of a gun, or to employ any other appropriate method.

In the case where the coating is applied in liquid form, the coating of the substrate can be carried out with the aid of a pneumatic gun, an applicator roller, a brush, by a dipping technique or by passing under a curtain of the "liquid" coating.

The film formation of the coating requires an energy input, which is provided by the action of an electromagnetic radiation in the microwave region.

Set-ups which are particularly suitable for the film formation of the coating according to the invention are those in which stationary waves are excited. It is known, in fact, that cavities resonating in the microwave region are the site of multiple reflections of electromagnetic fields at the conductive walls of the cavity, and this leads to the existence of vibration nodes and antinodes of these fields.

At the electrical field antinodes, the intensity of the electrical field is very high in relation to what this intensity would be in progressive waves without reflections. For a given microwave power, this increase in intensity is proportional to $\sqrt{Q}$, Q being the overvoltage factor of the resonant cavity.

Conversely, at the electrical field nodes, the intensity of the electrical field is practically zero.

It has been noted that when the coating remains stationary while it is subjected to an electromagnetic radiation according to the invention, the formation of a film of the coating is sudden under the antinodes of the field and heating is so intense that it causes partial melting of the substrate and/or causes its distortion, whereas under the nodes of the field, the energy of the electromagnetic radiation is not sufficiently great to produce the formation of a film of the coating.

In the film-forming process in accordance with the invention, the substrate to be coated is set in motion inside the resonant cavity so that the surface of the coating is successively exposed to the nodes and to the antinodes and so that therefore the energy received by the coating is as uniform as possible.

The motion of the substrate to be coated may be linear, and this can be obtained, for example, by placing the said substrate on a conveyor belt.

The substrate to be coated may also be subjected to a rotary motion, for example by using a turntable.

The speed of travel or of rotation must not be too slow, or otherwise the film formation is not ensured in a uniform manner; some parts of the coating remain for too long under the antinodes which can cause distortion and/or melting of the substrate, whereas other parts do not reach film formation because they remain exposed for too long under the nodes of the field. The particular speed of movement and length of exposure to the microwaves will vary dependent mainly upon the particular coating used and the thickness thereof and for any given coating can be readily ascertained by routine experimentation.

The following examples further describe and illustrate the invention without, however, limiting it.

EXAMPLE 1

A—PREPARATION OF THE COATING

A millbase is prepared by mixing a part of the constituents of the coating in dispersion in one or more solvents.

The operation is carried out in a bead disperser.

Once the dispersion has been produced, the remainder of the coating is added and the constituents are mixed intimately.

B—CONSTITUENTS OF THE COATING

| 1) Millbase | |
|---|---|
| This comprises (in grams): | |
| acrylic emulsion with a solids content of 50% by weight (Tukon hardness 9.4; $3 \leq pH \leq 4$) | 10 |
| butyl diglycol ether | 4 |
| methyl ethyl glycol | 5 |
| aminopropanol | 0.6 |
| polyvinylidene fluoride (melt flow index (MFI) measured according to ISO standard 1133: 5 g/10 min) of mean particle size equal to 3 μm | 66 |
| demineralized water | 35 |
| hexakismethoxymeiamine | 2 |
| titanium dioxide | 66 |
| octylphenoloxypolyethanol-based surface-active agent | 0.7 |
| polysiloxane-based antifoaming agent | 0.7 |
| 2) Complement | |
| acrylic emulsion with a solids content of 47% by weight (Tukon hardness 6.5; $8.6 \leq pH \leq 9.2$) | 54 |
| surface-active agent based on 2,4,7,9-tetramethyldecyn-4,7-diol in solution in ethylene glycol (concentration: 50% by weight) | 1.2 |
| dimethyl phthalate | 13.5 |

C—USE OF THE COATING

The coating prepared according to A is applied with a 100 μm bar onto a small polypropylene plaque (10×10×0.3 cm), previously degreased with methyl ethyl ketone.

The polypropylene of which the small plaque is made has a melting point of 163° C. and a deformation temperature under a load of 0.46 MPa equal to 85° C., measured according to ASTM standard D 648.

The film-forming temperature of the coating is equal to 172° C.

D—PREPARATION OF THE COMPOSITE MATERIAL

The substrate thus coated is placed on a conveyor belt whose speed is controlled at 0.7 m/min. A microwave generator of variable power of between 0 and 3 kW is employed, which is set to 1.8 kW, and a resonant applicator is employed, which makes it possible to obtain the excitation of the TE103 mode over a width of 240 mm and a working height of 20 mm.

The 3rd dimension is set at 63.1 mm so as to obtain a guided wavelength equal to approximately 48 cm.

Once the small plaque has finished passing through the resonant cavity, the film formation is finished.

The 25 μm thick coating is glossy and smooth in appearance over the whole coated surface of the small plaque; no distortion of the coated small plaque is observed.

The quality of the coating is assessed with the aid of the following test, referred to hereinafter by the expression "methyl ethyl ketone resistance test".

A cottonwool is saturated with methyl ethyl ketone and is rubbed over the coating and the number of forward and return strokes at which degradation of the coating and appearance of the substrate occur is counted.

An average number of forward and return strokes of 50 corresponds to a coating of good quality.

The result of the methyl ethyl ketone test performed on the small plaque of Example 1 is 50 forward and return strokes.

EXAMPLE 2

Comparative

A substrate is coated by reproducing the operating conditions described in 1.A, 1.B, and 1.C.

To ensure the film-forming of the coating, an applicator of the Pulsar ST type, which delivers progressive waves, is employed.

The small plaque remains stationary inside the enclosure and is exposed to the action of microwaves for 1 min.

Only the drying of the coating is obtained, without film formation.

The methyl ethyl ketone resistance test gives a result of 0 forward and return strokes.

EXAMPLE 3

Comparative

A substrate is coated by reproducing the operating conditions described in 1.A, 1.B, and 1.C.

To ensure film-forming of the coating an applicator of the pseudo-resonant Pulsar R59 type, equipped with a 1.2 kW power generator delivering stationary waves is employed.

The small plaque remains stationary inside the enclosure and is exposed to the action of microwaves for 2 min 30 seconds.

The temperature obtained at the antinodes of the field attains 180° C., leading to local melting of the substrate.

In the molten regions the methyl ethyl ketone resistance test gives a result of 50 forward and return strokes.

A highly distorted composite material is obtained, in which the film formation of the surface coating is noncontinuous.

EXAMPLE 4

Comparative

A substrate is coated by reproducing the operating conditions described in 1.A, 1.B, and 1.C.

To ensure the film formation of the coating, an applicator operating as a resonant cavity, equipped with a 1.2 kW power generator is employed. The small plaque is deposited onto a belt whose speed of travel is 0.2 m/min.

After treatment, the temperature of the small plaque reaches 50° C. without the latter being distorted.

EXAMPLE 5

Comparative

A substrate is coated by reproducing the operating conditions described in 1.A, 1.B, and 1.C.

To ensure the film formation of the coating, an applicator operating as a resonant cavity and equipped with a 1.2 kW power generator is employed. The small plaque remains stationary inside the enclosure and is exposed to the action of microwaves for 2 min 30 seconds.

After treatment, only the regions corresponding to the antinodes reaches 200° C. and exhibit a true film formation.

The methyl ethyl ketone resistance test performed on the molten regions gives a result of 50 forward and return strokes.

A highly distorted composite material is obtained, in which the film formation of the surface coating is noncontinuous.

EXAMPLE 6

Comparative

A substrate is coated by reproducing the operating conditions described in 1.A, 1.B, and 1.C.

To ensure the film formation of the coating, an applicator operating as a resonant cavity and equipped with a 1.2 kW power generator is employed.

The small plaque is placed on a belt whose speed of travel is 0.5 m/min.

Under the antinodes of the field the temperature reaches 130° C. and decreases quickly again to 70° C. at the adjacent nodes.

Drying of the coating is obtained, and not its film formation.

The methyl ethyl ketone resistance test gives a result of 0 forward and return strokes

EXAMPLE 7

Comparative

The operating conditions of Example 6 are reproduced, but with a speed of travel of the small plaque in the enclosure of 0.18 m/min.

Under the antinodes of the field the temperature reaches 200° C. and decreases to 80° C. at the nodes.

The methyl ethyl ketone resistance and test applied to the molten regions given a result of 50 forward and return strokes.

A highly distorted composite material is obtained, in which the film formation of the surface coating is noncontinuous.

EXAMPLE 8

A—PREPARATION OF THE COATING

The constituents of the coating, which are in the form of powder with a mean particle size equal to 100 μm, are mixed.

B—CONSTITUENTS OF THE COATING

The powder composition comprises (in grams):

| | |
|---|---|
| polyvinylidene fluoride with a mean particle size equal to 90 μm (MFI: 20 g/10 min, measured according to ISO standard 1133) | 70 |
| thermoplastic acrylic resin with a mean particle size equal to 80 μm (Tukon hardness: 15-16; Tg: 60° C.) | 30 |
| titanium dioxide | 20 |

C—USE OF THE COATING

The coating described in B is applied by sieving onto a small polypropylene plaque (10×10×0.3 cm) previously degreased with methyl ethyl ketone.

The average thickness of deposited powder is equal to 400 μm.

The polypropylene of which the small plaque consists has a melting point of 163° C. and a temperature of distortion under a load of 0.46 MPa equal to 85° C., measured according to ASTM standard D 648.

The film-formation temperature of the coating is equal to 171° C.

D—PREPARATION OF THE COMPOSITE MATERIAL

The substrate thus coated is placed on a belt whose speed of travel is 0.7 m/min inside the enclosure.

A 1.8 kW power generator and a resonant applicator as described in 1.D are employed.

After treatment, the 120 μm thickness coating has a glossy and uniform appearance.

The film formation of the coating is continuous and no distortion of the small coated plaque is observed.

The methyl ethyl ketone resistance test gives a result of 52 forward and return strokes.

EXAMPLE 9

A small uncoated polypropylene plaque is exposed to the action of microwaves under the same conditions as in 1.D.

After treatment, the surface temperature of the small plaque is equal to 40° C.

EXAMPLE 10

A small plaque of high density polyethylene (HDPE) whose melting point is equal to 130° C. is coated with the aid of a coating of the same characteristics as that described in 1.A and 1.B.

The small HDPE plaque thus coated is subjected to the action of microwaves in the same way as described in 1.D.

After treatment, the 25 μm thickness coating has a glossy appearance and the film formation is continuous. No distortion of the small plaque is observed.

The methyl ethyl ketone resistance test gives a result of 55 forward and return strokes.

EXAMPLE 11

A—PREPARATION OF THE COATING

The following constituents of the coating are mixed using a high-speed turbine:

B—CONSTITUENTS OF THE COATING

The composition of the coating comprises (in grams):

| | |
|---|---|
| demineralized water | 22.4 |
| potassium silicate | 1.12 |
| acrylic emulsion with a solids content of 46% by weight (Tukon hardness 12; pH 10) | 1.56 |
| copolymer of vinylpyrrolidone and of vinyl acetate (60/40) with a solids content of 10% by weight in water | 1.12 |
| acrylic emulsion with a solids content of 12% by weight (Tukon hardness: 10; 9 ≦ pH ≦ 10) | 28.7 |
| bacterial and fungicidal agent | 0.2 |
| polyamide 12 with a mean particle size of 10 μm (inherent viscosity in metal-cresol at 25° C.: 1.05) | 44.9 |

C—USE OF THE COATING

The coating is applied using a 100 μm bar onto a small polypropylene plaque (10×10×0.3 cm) degreased with methyl ethyl ketone beforehand.

The polypropylene of which the small plaque consists has a melting point of 163° C. and a temperature of deformation under a load of 0.46 MPa equal to 85° C., measured according to ASTM standard D 648.

The film-formation temperature of the coating is 176° C.

D—PREPARATION OF THE COMPOSITE MATERIAL

The substrate thus coated is placed on a belt whose speed of travel is 0.7 m/min inside the enclosure.

A 1.8 kW power generator and a resonant applicator as described in 1.D are employed.

After treatment, the 24 μm thickness coating is satin in appearance and smooth over the whole coated surface of the small plaque and no distortion of the coated small plaque is observed.

The methyl ethyl ketone resistance test performed on the small plaque gives a result of 60 forward and return strokes.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A composite material comprising a substrate which is not or very slightly excitable by microwaves and an adherent coating on at least a portion of said substrate based on polymeric composition containing at least 50% by weight of a polymer excitable by microwaves, wherein the melting point of the substrate is lower than the film-formation temperature of the polymeric composition and said coating is adhered to said substrate by utilizing only electromagnetic radiation in the microwave region.

2. The composite material of claim 1, wherein the thickness of the coating is lower than or equal to about 300 μm.

3. The composite material of claim 2, wherein the substrate is based on at least one perhalogenated or non-perhalogenated polyolefin.

4. The composite material of claim 3, wherein the polyolefin is a polyethylene, polypropylene, polytetrafluoroethylene, or mixtures thereof, and the thickness of the coating is less than about 100 μm.

5. The composite material according to any one of claims 1 to 4, wherein the polymeric composition comprises:
 (a) homo- or copolymers of the monomers of the esters of acrylic and methylacrylic acid, fumaric and maleic acids, or vinyl esters, acrylamides, aminomethacrylates, or hydroxyacrylates, Nmethylolacrylamides, acrylic and methacrylic acids, vinyl or vinylidene halides, or alkyl or vinyl esters,
 (b) copolymers of vinylidene fluoride and of one or more perfluorinated or chlorofluorinated comonomers,
 (c) polyamides, and/or
 (d) polyetheramides.

6. The composite material according to any one of claims 1 to 4, characterized in that the polymeric composition contains polyvinylidene fluoride.

7. A process for the manufacture of composite material comprising a substrate which is not or very slightly excitable by microwaves and an adherent film on at least a portion of said substrate based on a polymeric composition containing at least 50% by weight of a polymer excitable by microwaves; the melting point of the substrate being lower than the film-forming temperature of the polymeric composition, the process comprising coating at least a portion of said substrate with said polymeric composition and forming said polymeric composition into a film by subjecting the coated substrate only to electromagnetic radiation in the microwave region which releases stationary waves for a time sufficient to convert said coating into a film adhering to said substrate.

8. The process of claim 7, wherein the polymeric composition is applied onto the substrate in pulverulent form.

9. The process of claim 7, wherein the polymeric composition is applied onto the substrate in liquid form.

10. The process of any one of claims 7, 8, or 9, wherein the coated substrate is kept in motion while being subjected to the electromagnetic radiation to ensure that the energy received by the coating is substantially uniform over the entire coating during the period of exposure to the electromagnetic radiation.

* * * * *

UNITED STATES PATENT AND TRADEMARK OFFICE
CERTIFICATE OF CORRECTION

PATENT NO. : 5,234,760
DATED : August 10, 1993
INVENTOR(S) : Berteaud, et al

It is certified that error appears in the above-indentified patent and that said Letters Patent is hereby corrected as shown below:

Col. 1, line 62, after "material" insert a period (.).

Col. 2, line 8, delete "30" and insert -- 300 --.

Col. 5, line 11, correct "TE103" to read "$TE_{103}$".

Signed and Sealed this

Twelfth Day of April, 1994

Attest:

BRUCE LEHMAN

Attesting Officer    Commissioner of Patents and Trademarks